(12) United States Patent
Abe

(10) Patent No.: US 11,575,144 B2
(45) Date of Patent: Feb. 7, 2023

(54) BATTERY MATERIAL STACKING SYSTEM

(71) Applicant: TOYOTA JIDOSHA KABUSHIKI KAISHA, Toyota (JP)

(72) Inventor: Nobuhira Abe, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 17/056,494

(22) PCT Filed: May 27, 2019

(86) PCT No.: PCT/JP2019/020802
§ 371 (c)(1),
(2) Date: Nov. 18, 2020

(87) PCT Pub. No.: WO2019/239863
PCT Pub. Date: Dec. 19, 2019

(65) Prior Publication Data
US 2021/0202976 A1 Jul. 1, 2021

(30) Foreign Application Priority Data
Jun. 12, 2018 (JP) .............................. JP2018-111540

(51) Int. Cl.
*H01M 10/04* (2006.01)
(52) U.S. Cl.
CPC ............... *H01M 10/0404* (2013.01); *H01M 10/0468* (2013.01)
(58) Field of Classification Search
CPC .............. B65G 49/068; B65G 47/914; B65G 47/915; B65G 47/917; B65G 47/918;
(Continued)

(56) References Cited

U.S. PATENT DOCUMENTS 3,822,008 A * 7/1974 Benner, Jr. ........... B65G 47/848
271/96

FOREIGN PATENT DOCUMENTS

JP 2012-174388 A 9/2012
JP 2017-081699 A 5/2017

OTHER PUBLICATIONS

International Search Report of PCT/JP2019/020802 dated Aug. 13, 2019.

* cited by examiner

*Primary Examiner* — Maria Laios
*Assistant Examiner* — Bartholomew A Hornsby
(74) *Attorney, Agent, or Firm* — Sughrue Mion, PLLC

(57) ABSTRACT

The present invention has as its object the provision of a battery material stacking system able to stack sheet-shaped workpieces relating to battery materials continuously at a high speed. The system is comprised of a conveyance mechanism 1 conveying sheet-shaped workpieces W relating to battery materials in a predetermined direction, a placement mechanism 2 placing workpieces W, and a stacking mechanism 3 stacking workpieces W. The placement mechanism 2 comprises a stator 21 of a linear motor having a predetermined running rail, a plurality of movers 22 of a linear motor provided at the stator 21, pickup members 23 provided at the movers 22 and picking up the workpieces W, and a control part 100 controlling running of the movers 22 at the stator 21. The pickup members 23 pick up the workpieces W conveyed from the conveyance mechanism 1 and rotationally convey the workpieces W along with the movers 22 running along the running rail of the stator 21, then stacking the workpieces W on the stacking mechanism 3.

4 Claims, 9 Drawing Sheets

(58) Field of Classification Search
CPC .............. B65G 47/945; B25J 15/0616; H01M 10/0413; H01M 10/0418; H01M 10/058; H01M 10/12; H01M 10/28; H01M 10/38; H01M 10/0404; H01M 10/0436; H01M 10/0468

See application file for complete search history.

BATTERY MATERIAL STACKING SYSTEM

CROSS REFERENCE TO RELATED APPLICATIONS

This application is a National Stage of International Application No. PCT/JP2019/020802 filed on May 27, 2019, claiming priority based on Japanese Patent Application No. 2018-111540 filed on Jun. 12, 2018.

FIELD

The present invention relates to a battery material stacking system stacking sheet-shaped workpieces relating to battery materials such as positive electrodes, negative electrodes, separators, or cells comprised of the same.

BACKGROUND

In the past, in car batteries, home batteries, electronic equipment batteries, and other various types of batteries, stack type batteries have been used. These stack type batteries are comprised of positive electrode plates, separators, negative electrode plates, and separators alternately stacked in that order. Such stack type batteries are better in efficiency of electric power generation per volume and better in heat dissipation compared with jelly roll type batteries comprised of battery materials rolled together, so are being widely used. However, stack type batteries require that a plurality of battery materials be stacked with a high precision without allowing positional deviation, so compared with jelly roll type batteries, there was the difficulty that the production tact time became longer.

In the manufacture of such stack type batteries, the technique of alternately stacking the electrode plates and separators or alternately stacking cells comprised of the electrode plates and separators combined together in advance has been known since the past (see Patent Literatures 1 to 2).

For example, in Patent Literature 1, an electrode plate stacking system in which alignment stages are moved and/or rotated in a horizontal direction so as to make positive electrode plates and negative electrode plates move and/or rotate to adjust them to suitable positions, then a first placement arm and second placement arm pick up the electrode plates is disclosed.

Further, in Patent Literature 2, a stacking system comprised of a stacking part having a carrying surface on which a stack is carried, a stopping part provided upright at one end of the carrying surface in a direction of movement of an electrode and making the electrode stop, and a stacking region provided between the carrying surface and stopping part, a gas blowing part arranged facing the carrying surface and blowing a gas toward the stacking region of the stacking part, and a control part controlling the gas blowing part so as to blow gas to an electrode supplied to the stacking part after the electrode abuts against the stopping part is disclosed.

CITATIONS LIST

Patent Literature

Patent Literature 1: Japanese Unexamined Patent Publication No. 2012-174388

Patent Literature 2: Japanese Unexamined Patent Publication No. 2017-081699

SUMMARY

Technical Problem

However, a conventional battery material stacking system had the problem of a difficulty of stacking battery materials continuously at a high speed.

The present invention was made in consideration of the above problem and has as its object the provision of a battery material stacking system able to stack sheet-shaped workpieces relating to battery materials such as positive electrodes, negative electrodes, separators, or cells comprised of the same continuously at a high speed.

Solution to Problem

To achieve the above object, the present invention provides a battery material stacking system stacking sheet-shaped workpieces relating to battery materials such as positive electrodes, negative electrodes, separators, or cells comprised of the same, which battery material stacking system comprises a conveyance mechanism conveying workpieces in a predetermined direction, a placement mechanism placing workpieces, and a stacking mechanism stacking workpieces, the placement mechanism comprising a stator of a linear motor having a predetermined running rail, a plurality of movers of a linear motor provided at the stator, pickup members provided at the movers and picking up the workpieces, and a control part controlling running of the movers at the stator, the pickup members picking up the workpieces conveyed from the conveyance mechanism and rotationally conveying the workpieces along with the movers running along the running rail of the stator, then stacking the workpieces on the stacking mechanism.

According to this, since pickup members are used to pick up workpieces conveyed from the conveyance mechanism and the workpieces are rotationally conveyed along with the movers running along the running rail of the stator, then the workpieces are stacked on the stacking mechanism, it is possible to stack sheet-shaped workpieces of battery materials continuously at a high speed.

Further, each pickup member may pick up another surface of a workpiece conveyed from the conveyance mechanism while picked up at one surface and the workpiece may be rotationally conveyed while being inverted along with the mover running along the running rail of the stator, then the workpiece may be stacked with the one surface facing the stacking mechanism. According to this, the placement mechanism can be used to place a workpiece from the conveyance mechanism to the stacking mechanism while inverting the one surface and the other surface front to back.

Further, each mover may stop relative to the stator when the pickup member stacks the workpiece on the stacking mechanism and thereby make the pickup member temporarily stop relative to the stacking mechanism. According to this, it is possible to stably stack a workpiece on the stacking mechanism.

Further, each pickup member may stack a workpiece on the stacking mechanism in a state with a front side edge of the workpiece in the rotational conveyance direction positioned lower than a rear side edge. According to this, it is possible to reliably stack a workpiece on the stacking mechanism.

Further, each pickup member may approach the conveyance mechanism in a state where, right before picking up the workpiece conveyed from the conveyance mechanism, the pickup surface picking up the workpiece becomes parallel with the plane of conveyance of the workpiece by the conveyance mechanism. According to this, the pickup surface of the pickup member approaches the workpiece in a parallel state, so the workpiece can be reliably picked up. Further, in particular, when the pickup member picks up a workpiece by suction, the suction time with respect to the workpiece can be sufficiently secured, so the workpiece can be more reliably picked up.

Further, each pickup member may separate from the conveyance mechanism in a state where, right after picking up the workpiece conveyed from the conveyance mechanism, the pickup surface picking up the workpiece becomes parallel with the plane of conveyance of the workpiece by the conveyance mechanism. According to this, it separates from the conveyance mechanism in the state where the workpiece becomes parallel, so after that it is possible to reliably rotationally convey the workpiece.

Further, each pickup member may approach the conveyance mechanism and/or the stacking mechanism by a guide mechanism. In particular, the guide mechanism is preferably provided with a cam member in which a cam groove of a predetermined path is formed and cam followers connected to the pickup members slidingly engaging with the cam groove. According to this, it is possible to make the configuration simpler and reliably realize the approach operation of the pickup member.

Further, each pickup member may be provided with at least a first pickup member and a second pickup member, the first pickup member may pick up a workpiece conveyed from the conveyance mechanism at a first location of the conveyance mechanism and rotationally convey it, then stack the workpiece at a first location of the stacking mechanism, and the second pickup member may pick up a workpiece conveyed from the conveyance mechanism at a second location of the conveyance mechanism and rotationally convey it, then stack the workpiece at a second location of the stacking mechanism. According to this, it is possible to simultaneously stack workpieces at least at two locations, so it is possible to efficiently produce a plurality of stacks of workpieces.

Further, the first pickup member may be made to approach the conveyance mechanism and/or the stacking mechanism by a first guide mechanism, while the second pickup member may be made to approach the conveyance mechanism and/or the stacking mechanism by a second guide mechanism. According to this, it is possible to make the configuration simpler and reliably realize the approach operation of a plurality of the pickup members.

Further, the first guide mechanism may be provided at a front side of the stator of the placement mechanism and the second guide mechanism may be provided at a rear side of the stator of the placement mechanism. According to this, the first pickup member and the second pickup member can pick up and stack workpieces at different locations without interfering with each other.

Further, each pickup member may pick up a workpiece by suction in a state with a predetermined gap formed with the workpiece. According to this, when the pickup member is picking up the workpiece, the pickup surface of the pickup member can be prevented from ending up rubbing against the surface of the workpiece. Further, in case where a plurality of placement mechanisms are provided, when a workpiece is made to pass through a predetermined placement mechanism so as to be picked up by the pickup member of the next placement mechanism, it is possible to prevent the workpiece from ending up being unintentionally picked up by the pickup member of the predetermined placement mechanism.

Further, each pickup member may be formed into a curved surface with the pickup surface picking up the workpiece gently curved outward. According to this, tension is created at the workpiece picked up at the pickup member, so it is possible to prevent the workpiece from rattling or curling up while being rotationally conveyed.

Further, the stacking mechanism may be provided with a stacking use stator of a linear motor having a predetermined running rail, stacking use movers of a linear motor provided at the stacking use stator, stacking tables provided at the stacking use movers and on which workpieces are stacked, and a control part controlling the running of the stacking use movers at the stacking use stator. According to this, at the time of starting stacking of workpieces, it is possible to quickly arrange the stacking tables at predetermined stacking locations and possible to quickly transport stacking tables to separate locations for each workpiece after stacking the workpieces, so it is possible to efficiently produce a plurality of stacks of workpieces.

Further, each stacking table may move by exactly a predetermined distance forward in the rotational conveyance direction while synchronized with rotational conveyance of the workpiece when the workpiece is stacked by the pickup member. According to this, by the stacking table moving by exactly a predetermined distance forward in the rotational conveyance direction while synchronized with rotational conveyance of the workpiece, the difference in speed of the workpiece and the stacking table at the time of stacking is absorbed, so it is possible to prevent or mitigate collision between the workpiece and latch members on the stacking table etc. and further prevent rubbing of the workpiece at the stacking surface and thereby becomes possible to obtain a better stack of workpieces.

Further, each stacking table may be provided with latch members for receiving a front side edge of a workpiece when a workpiece is stacked at a position at the front side in the rotational conveyance direction. According to this, it is possible to reliably stack workpieces on the stacking table in the state with the front side ends of the workpieces aligned.

Further, along the conveyance direction of the conveyance mechanism, a plurality of sets of the placement mechanisms and the stacking mechanisms may be provided and after a predetermined number of workpieces finish being stacked by a predetermined set of the placement mechanism and the stacking mechanism, other workpieces may start to be stacked by another set of the placement mechanism and the conveyance mechanism. According to this, after a predetermined number of workpieces finish being stacked by a predetermined set, other workpieces can quickly start being stacked by another set without interruption. During that time, the predetermined number of workpieces of the predetermined set can be conveyed to the next process. For this reason, compared with a conventional intermittent type stacking system, it is possible to continuously stack and convey workpieces and becomes possible to strikingly improve the efficiency of battery manufacture.

Further, the battery material stacking system according to the present invention provides a battery material placement system placing sheet-shaped workpieces relating to battery materials such as positive electrodes, negative electrodes, separators, or cells comprised of the same, which battery material stacking system comprises a stator of a linear motor having a predetermined running rail, a plurality of movers of a linear motor provided at the stator, pickup members provided at the movers and picking up the workpieces, and a control part controlling running of the movers at the stator, the pickup members holding a predetermined number of the workpieces and rotationally conveying the workpieces along with the movers running along the running rail of the stator, then placing the workpieces at a separate location. According to this, it is possible to have workpieces at a predetermined location be picked up by pickup members and the workpieces rotationally conveyed along with the movers running along the running rail of the stator, then place the workpieces at a separate location, so it is possible to place sheet-shaped workpieces relating to battery materials continuously at a high speed.

Further, the battery manufacturing system according to the present invention is characterized by the provision of the battery material stacking system or the battery material placement system. According to this, it is possible to efficiently manufacture batteries.

Advantageous Effects of Invention

According to the present invention, it is possible to use a pickup member to hold a workpiece conveyed from a conveyance mechanism, rotationally convey the workpiece along with a mover running along the running rail of the stator, then stack the workpiece at a stacking mechanism, so it is possible to stack sheet-shaped workpieces relating to battery materials continuously at a high speed and in turn efficiently manufacture batteries.

DESCRIPTION OF EMBODIMENTS

First Embodiment

Figure 1:
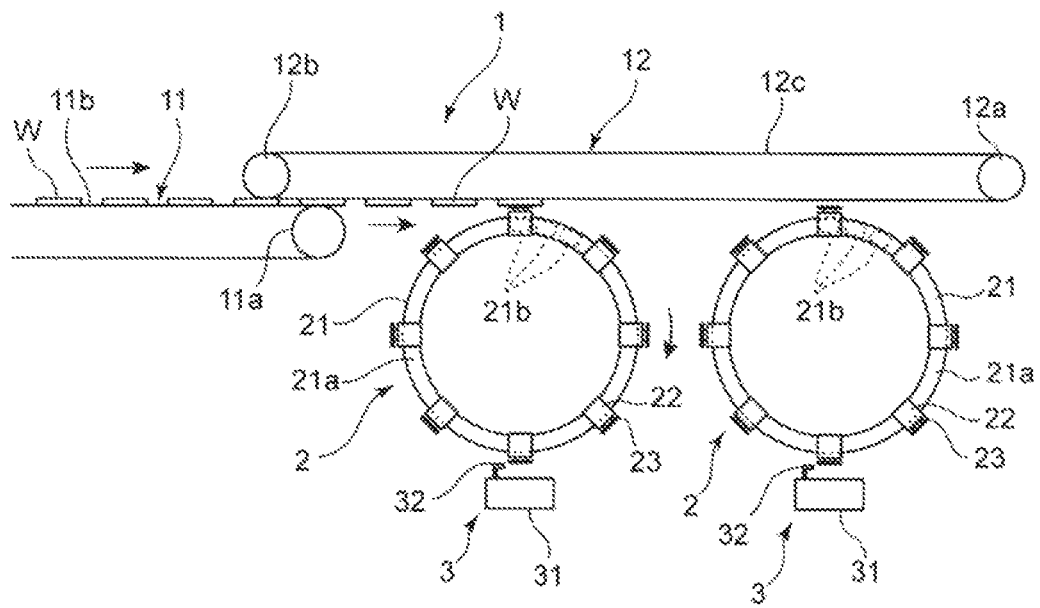
FIG. 1 is a front view showing a battery material stacking system according to a first embodiment of the present invention.

Next, a first embodiment of a battery material stacking system according to the present invention (below, referred to as the "present system") will be explained while referring to FIG. 1 to FIGS. 5 (a) to 5 (c).

Note that, in the present embodiment, the case of stacking sheet-shaped workpieces W relating to battery materials of positive electrodes, negative electrodes, separators, and cells comprised of the same will be explained. Further, the workpieces W are extremely thin, so for convenience in explanation, in the drawings, the workpieces W are illustrated given extra thicknesses.

The present system, as shown in FIG. 1, is provided with a conveyance mechanism 1 conveying workpieces W in a predetermined conveyance direction (right direction in FIG. 1), two placement mechanisms 2 arranged below the conveyance mechanism 1 aligned along the conveyance direction of the workpieces W, stacking mechanisms 3 arranged below the placement mechanisms 2, and a control part 100 controlling the operations of the conveyance mechanism 1, placement mechanisms 2, and stacking mechanisms 3. Overall, the conveyance mechanism 1, placement mechanisms 2, and stacking mechanisms 3 are arranged aligned along the vertical direction.

The conveyance mechanism 1 is comprised of a first conveyance mechanism 11 arranged at an upstream side in the conveyance direction of the workpieces W and a second conveyance mechanism 12 arranged at a downstream side in the conveyance direction of the workpieces W. The upstream side end of the second conveyance mechanism 12 in the conveyance direction and the downstream side end of the first conveyance mechanism 11 in the conveyance direction are arranged in a state superposed at the top and bottom.

The first conveyance mechanism 11 is comprised of a main drive shaft 11a provided at a downstream side in the conveyance direction of the workpieces W, a not shown driven shaft provided at an upstream side in the conveyance direction of the workpieces W, and a conveyor belt 11b strung between the main drive shaft 11a and the driven shaft in an endless state. By rotation of the main drive shaft 11a, the upper side belt conveyor 11b moves in the conveyance direction.

The second conveyance mechanism 12 is comprised of a main drive shaft 12a provided at a downstream side in the conveyance direction of the workpieces W, a driven shaft 12b provided at an upstream side in conveyance direction of the workpieces W, and a conveyor belt 12c strung between the main drive shaft 12a and the driven shaft 12b in an endless state. By rotation of the main drive shaft 12a, the lower side belt conveyor 12c moves in the conveyance direction.

Furthermore, workpieces W are placed on the upper side belt conveyor 11b of the first conveyance mechanism 11 facing the other surface Wb, then are successively conveyed toward the downstream side in the conveyance direction in accordance with movement of the top side belt conveyor 11b. Further, when reaching the downstream side end of the first conveyance mechanism 11, the workpieces W are picked up by suction at one surface Wa at the bottom side conveyor belt 12c of the second conveyance mechanism 12, then are successively conveyed held in a hanging state toward the downstream side of the conveyance direction along with movement of the bottom side belt conveyor 12c.

Note that, in the process of being conveyed by the second conveyance mechanism 12, a predetermined number of the workpieces W are stacked by one set of the placement mechanism 2 and the stacking mechanism 3 at the upstream side in the conveyance direction, then a predetermined number are stacked by one set of the placement mechanism 2 and the stacking mechanism 3 at the downstream side.

The placement mechanism 2 is provided with a stator 21 of a linear motor having a circular loop-shaped running rail, a plurality of movers 22 of a linear motor provided at the stator 21, and pickup members 23 provided at the movers 22 and picking up the workpieces W. The workpieces W are moved in the vertical direction from the top to the bottom.

Figure 2:
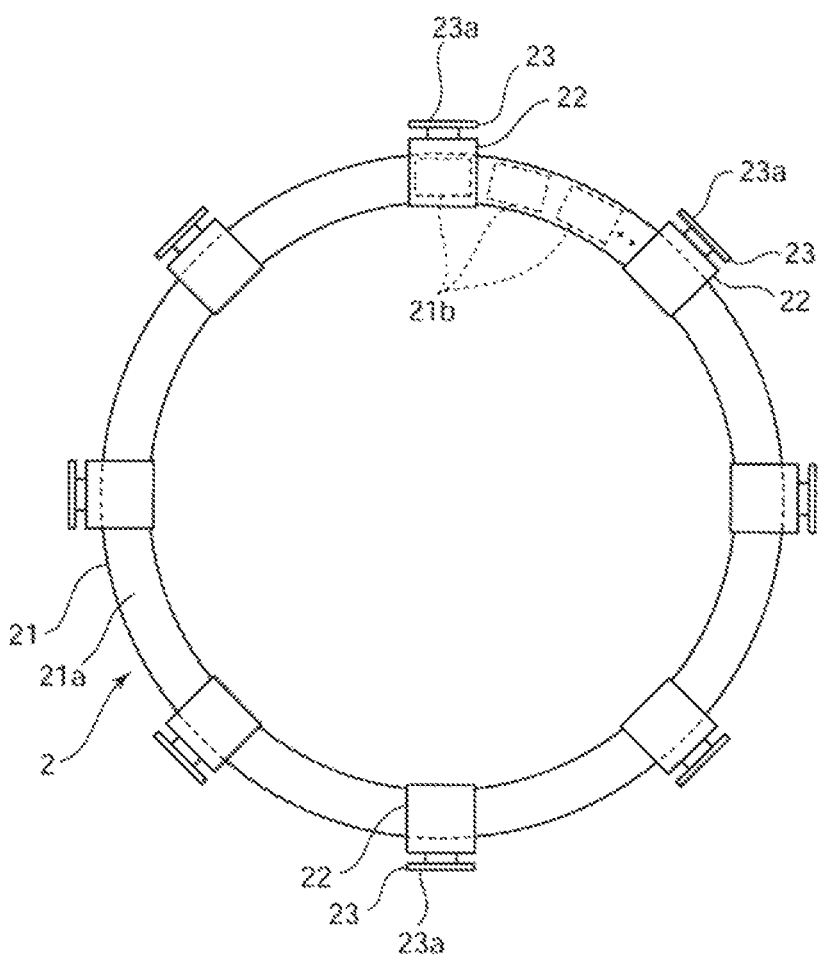
FIG. 2 is a front view showing a placement mechanism of the system of FIG. 1.
Figure 4:
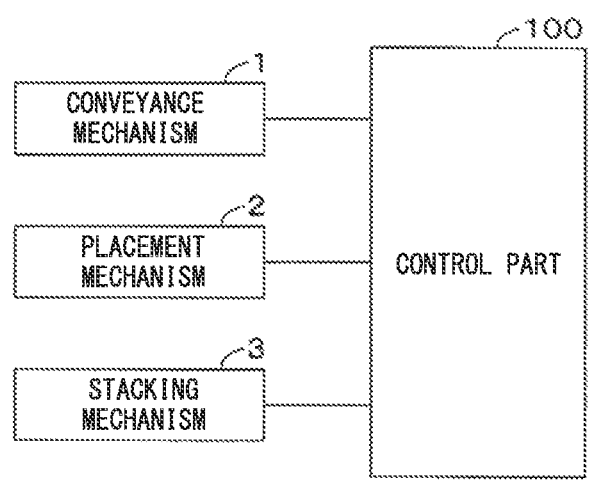
FIG. 4 is a block diagram showing an electrical configuration of the system of FIG. 1.

The stator 21, as shown in FIG. 2, is made of a metal etc. and is formed into a front view circular shape. At the peripheral edges, a guide rail 21a is provided. This guide rail 21a has a circular running rail following the shape of the stator 21. Inside of the peripheral edges, a plurality of electromagnets 21b (coil units) are arranged aligned over the entire circumference. These electromagnets 21b, as shown in FIG. 4, are controlled by the control part 100. If the current supplied from the not shown power source changes, the polarity changes.

Figure 3:
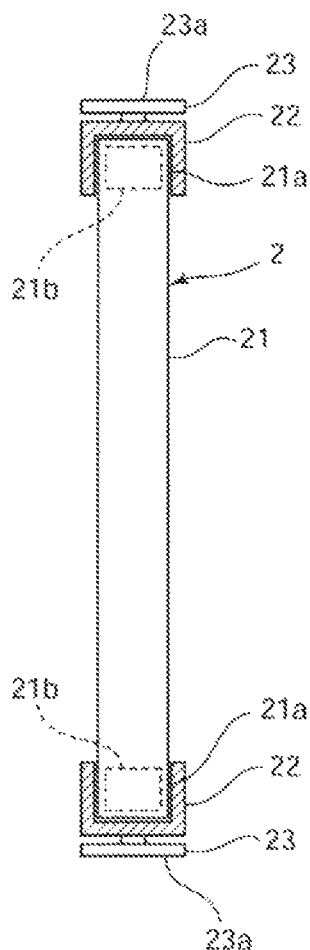
FIG. 3 is a cross-sectional view showing the placement mechanism of the system of FIG. 1.

The movers 22, as shown in FIG. 3, are made of metal and formed into cross-sectional U-shapes and are provided in a state able to run along the guide rail 21a of the stator 21. The movers 22 are provided with permanent magnets inside them. The permanent magnets are subjected to attraction forces and repulsion forces depending on the changes in polarities of the electromagnets 21b of the stator 21. Due to this, if the control part 100 is used to repeatedly change the polarities of the electromagnets 21b of the stator 21 along a predetermined direction, along with this, the permanent magnets of the movers 22 are successively pulled by the polarities of the electromagnets 21b of the stator 21 whereupon the movers 22 receive thrust in a predetermined direction, so the movers 22 run along the running rail of the stator 21 while drawing a circular path. At this time, the control part 100 can be used to change the time interval of change of polarities of the electromagnets 21b of the stator 21 to thereby make the running speed of the movers 22 change or to stop the movers 22.

The pickup members 23, as shown in FIG. 2 and FIG. 3, are provided at the outsides of the movers 22 in the diametrical direction. The front ends thereof are made flat pickup surfaces 23a which pick up the workpieces W by suction. The pickup members 23 are made ones rotating on the circular running rail of the stator 21 along with running of the movers 22.

Furthermore, in the process of being conveyed by the second conveyance mechanism 12 in the conveyance direction, the workpieces W are picked up at the other surfaces Wb by the pickup members 23 of the placement mechanisms 2 and are rotationally conveyed to the lower stacking mechanism 3 while inverting one surface Wa and the other surface Wb front and back along with rotation of the pickup members 32, then are stacked on the later explained stacking tables 31 of the stacking mechanisms 3 while making the one surface Wa face them.

The stacking mechanisms 3 are provided with stacking tables 31 successively stacking workpieces W rotationally transferred by the pickup members 23 and are made ones which can adjust the positions or postures of the workpieces W by making the workpieces W gradually move downward or move and rotate in the planar direction each time they are stacked by the control part 100 through a drive system. Note that when adjusting the positions or postures of the workpieces W, it may also be made one which captures images of the workpieces W by a not shown imaging device.

Further, the stacking tables 31 are provided with latch members 32 at front side positions in the rotational conveyance direction of the workpieces W. These latch members 32 are made ones which receive the front side ends of the workpieces W when the workpieces W are stacked by the pickup members 23. Note that, latch members which press down the rear side edges of the workpieces W after the workpieces W are stacked on the stacking tables 31 may also be provided.

Figure 5:
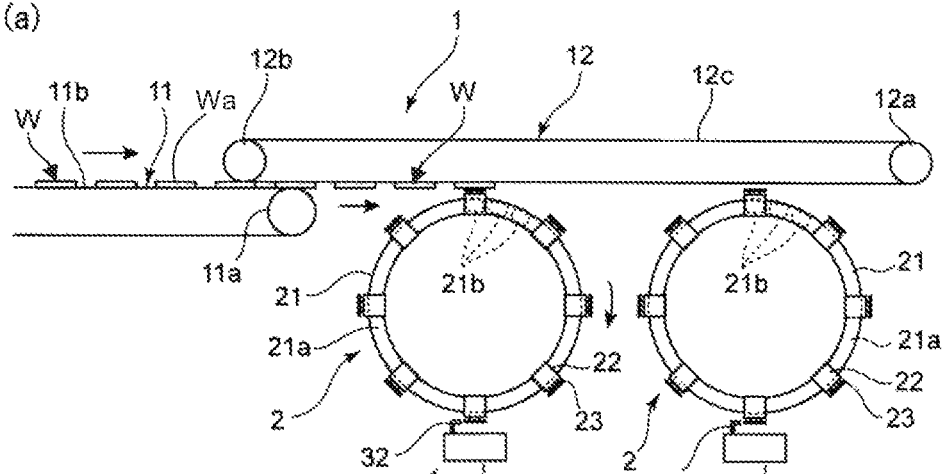
FIGS. 5 (a) to 5 (c) are views showing an operation of the system of FIG. 1.
Figure 5:
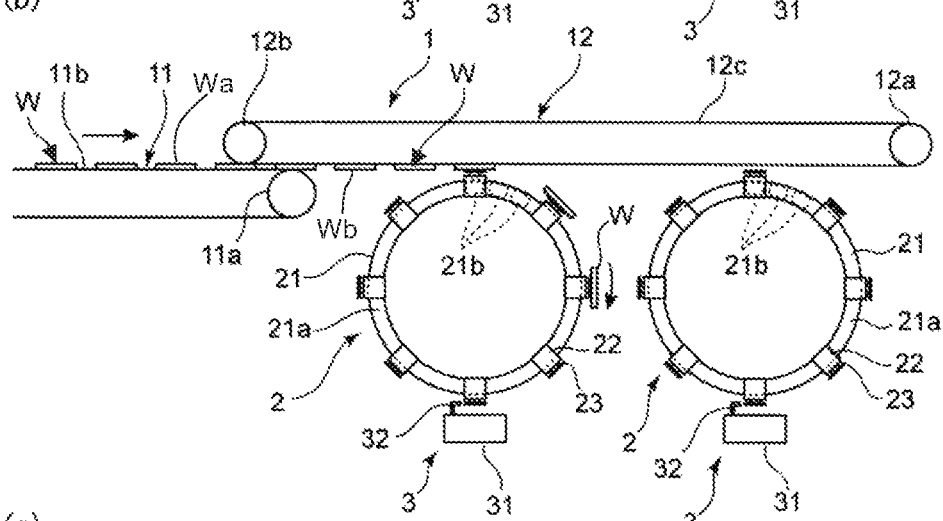
Figure 5:
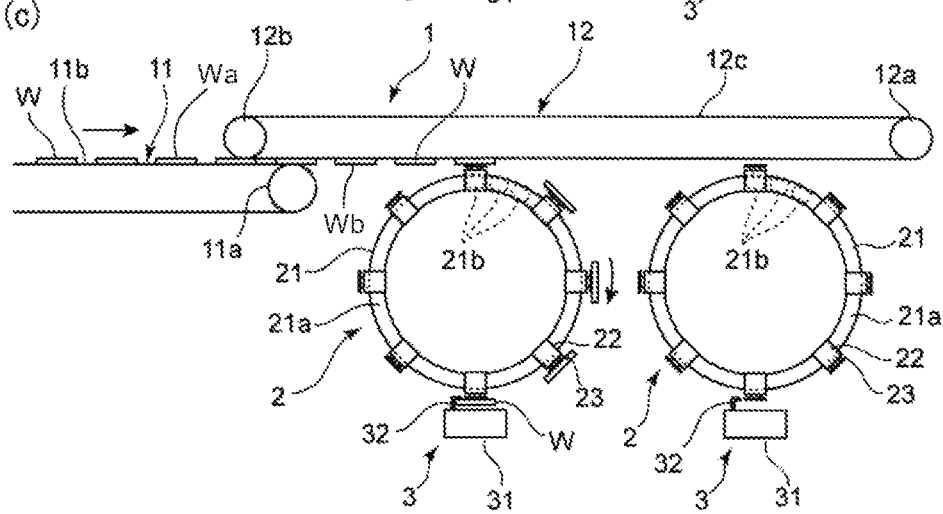

The control part 100, as shown in FIGS. 5 (a) to 5 (c), controls the conveyance operation of the conveyance mechanism 1, the running operation of the movers 22 at the stators 21 of the placement mechanisms 2, the operation of the stacking tables 31 of the stacking mechanisms 3 (drive system), etc.

Next, the method of stacking the workpieces W according to the present system will be explained while referring to FIGS. 5 (a) to 5 (c).

First, workpieces W are set on the upper side belt conveyor 11b of the first conveyance mechanism 11 with the other surface Wb facing the same, then are successively conveyed toward the downstream side of the conveyance direction along with movement of the upper side belt conveyor 11b. Further, when reaching the downstream side end of the first conveyance mechanism 11, the workpieces W are picked up by suction at the one surface Wa at the lower side belt conveyor 12c of the second conveyance mechanism 12, then are successively conveyed in a hanging state toward the downstream side of the conveyance direction along with movement of the lower side belt conveyor 12c.

Next, the workpieces W, as shown in FIG. 5 (b), are successively picked up at the other surfaces by the pickup members 23 of the placement mechanisms 2 in the process in which the workpieces W are conveyed by the second conveyance mechanism 12 in the conveyance direction.

Next, the workpieces W, as shown in FIG. 5 (c), are turned half circumferences to the right along with the movers 22 running along the running rail of the stator 21 and thereby successively rotationally conveyed to the lower stacking table 31 while being inverted front and back at the one surface Wa and the other surface Wb by the pickup members 23.

Next, due to the release of the picked up states of the workpieces W by the pickup members 23, as shown in FIG. 5 (c), the workpieces W are successively stacked on the stacking table 31 while the one surface Wa of the workpiece W is made to face the stacking table 31 and while the front side edge of the workpiece W is received by the latch members 32. Note that, after the workpieces W are stacked on the stacking table 31, along with the movers 22 running along the running rail of the stator 21, the pickup members 23 further turn a half circumference to the right and again returns to a location picking up the workpieces W at the second conveyance mechanism 12.

After that, when a predetermined number of workpieces W are stacked on the stacking table 31, the stacking table 31 moves together with the stack of workpieces W or the stack of the workpieces W is gripped and transported to another location.

Note that, after a predetermined number of workpieces W finish being stacked by one set of the placement mechanism 2 and the stacking mechanism 3 at the upstream side in the conveyance direction, workpieces W start to be stacked by one set of the placement mechanism 2 and stacking mechanism 3 at the downstream side and a predetermined number of workpieces W stacked by the upstream side set of the placement mechanism 2 and stacking mechanism 3 are conveyed to the next process. Further, after a predetermined number of workpieces W finish being stacked by the downstream side placement mechanism 2 and stacking mechanism 3, the workpieces W again start being stacked by the upstream side placement mechanism 2 and stacking mechanism 3 and a predetermined number of workpieces W stacked by the downstream side placement mechanism 2 and stacking mechanism 3 are conveyed to the next process.

In this way, after a predetermined number of workpieces W relating to a predetermined set of the placement mechanism 2 and stacking mechanism 3 at the upstream side or downstream side finish being stacked, it is possible to start stacking workpieces relating to another set at the downstream side or upstream side without interruption. During that time, it is possible to convey the predetermined number of workpieces W relating to the predetermined set at the upstream side or downstream side to the next process. For this reason, compared with the conventional intermittent type stacking system, it is possible to continuously stack and convey workpieces W and possible to strikingly improve the efficiency of manufacture of batteries.

Second Embodiment

Figure 6:
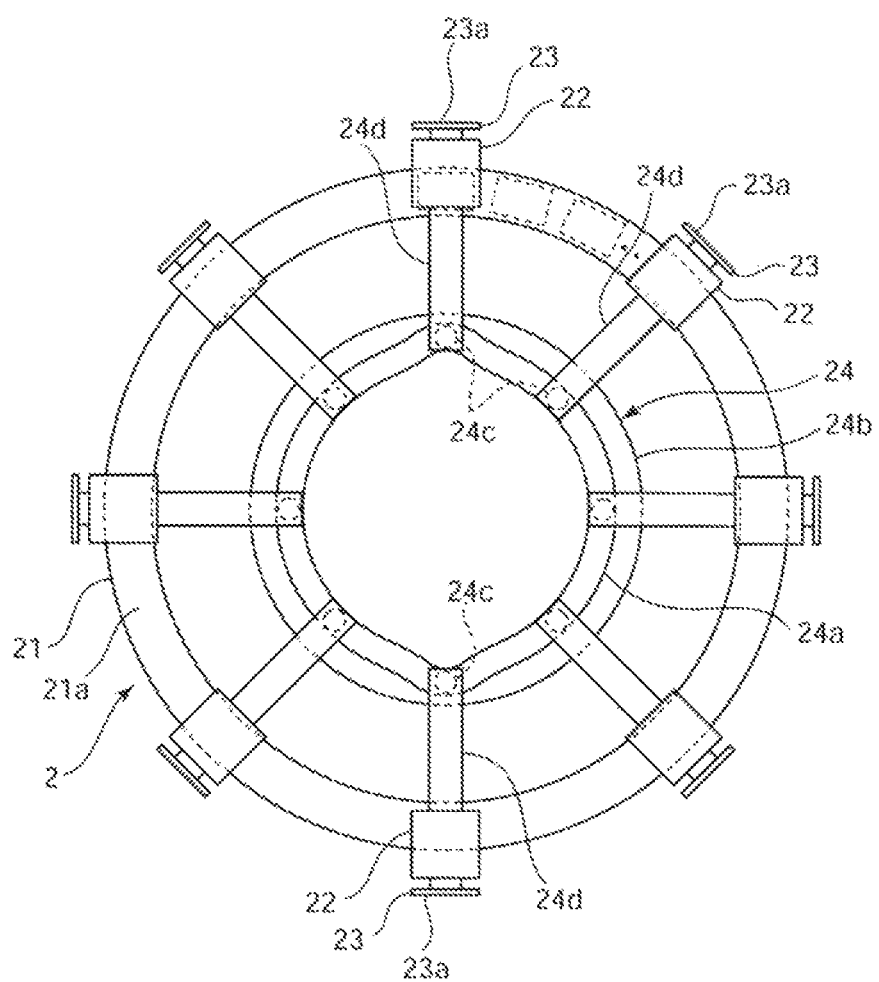
FIG. 6 is a front view showing a placement mechanism of a battery material stacking system according to a second embodiment of the present invention.
Figure 7:
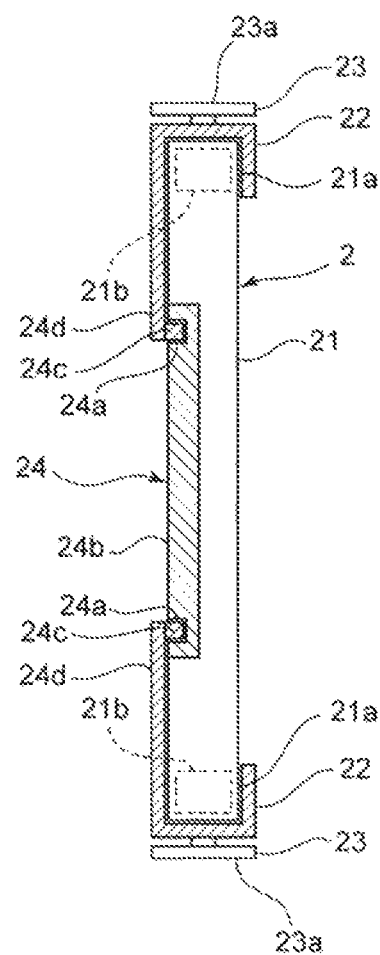
FIG. 7 is a cross-sectional view showing the placement mechanism of the system of FIG. 6.

Next, a second embodiment of the present system according to the present invention will be explained while referring to FIG. 6 and FIG. 7. Note that, in the following embodiments, only the configurations different from the first embodiment will be explained. The same configurations will be omitted from the explanations and assigned the same notations.

In the present system, a guide mechanism 24 is provided at each placement mechanism 2. This guide mechanism 24 is provided with a cam member 24b in which a cam groove 24a having a predetermined path is formed, support members 24d connected to the pickup members 23, and cam followers 24c provided at the support members 24d and engaging with the cam groove 24a in a sliding manner. In the present embodiment, the cam groove 24a is formed in a substantially circular path sticking out in the diametrical direction at a top end part and bottom end part.

Moreover, when rotating along with rotational running of the movers 22 at the stator 21, the pickup members 23 are guided by the cam groove 24a through the cam followers 24c of the guide mechanism 24, whereby the pickup members 23 approach the second conveyance mechanism 12 near top dead center of rotation, so can reliably pick up the workpieces W conveyed from the second conveyance mechanism 12. Further, in the same way, the pickup members 23 approach the stacking table 31 of each stacking mechanism 3 near bottom dead center of rotation, so can reliably stack the workpieces W on the stacking table 31 of the stacking mechanism 3.

Note that, the pickup members 23 may use the guide mechanism 24 etc. to approach the second conveyance mechanism 12 in a state where the pickup surface 23a picking up the workpiece W becomes parallel to the plane of conveyance of the workpiece W by the second conveyance mechanism 12, right before picking up the workpiece W conveyed from the second conveyance mechanism 12.

Further, the pickup member 23 may use the guide mechanism 24 etc. to separate from the second conveyance mechanism 12 in a state where the pickup surface 23a picking up the workpiece W becomes parallel to the plane of conveyance of the workpiece W by the second conveyance mechanism 12, right after picking up the workpiece W conveyed from the second conveyance mechanism 12.

Further, the pickup member 23 may stack a workpiece W on the stacking table 31 of the stacking mechanism 3 in a state made to tilt by the guide mechanism 24 etc. so that the front side edge of the pickup member 23 in the rotational conveyance direction of the workpiece W is positioned below the rear side edge thereof.

Further, the guide mechanism 24 is made one comprised of the above-mentioned cam groove 24a, cam member 24b, cam followers 24c, and support members 24d, but it may also be a cylinder mechanism, linear mechanism, plunger mechanism, or other mechanism.

Third Embodiment

Figure 8:
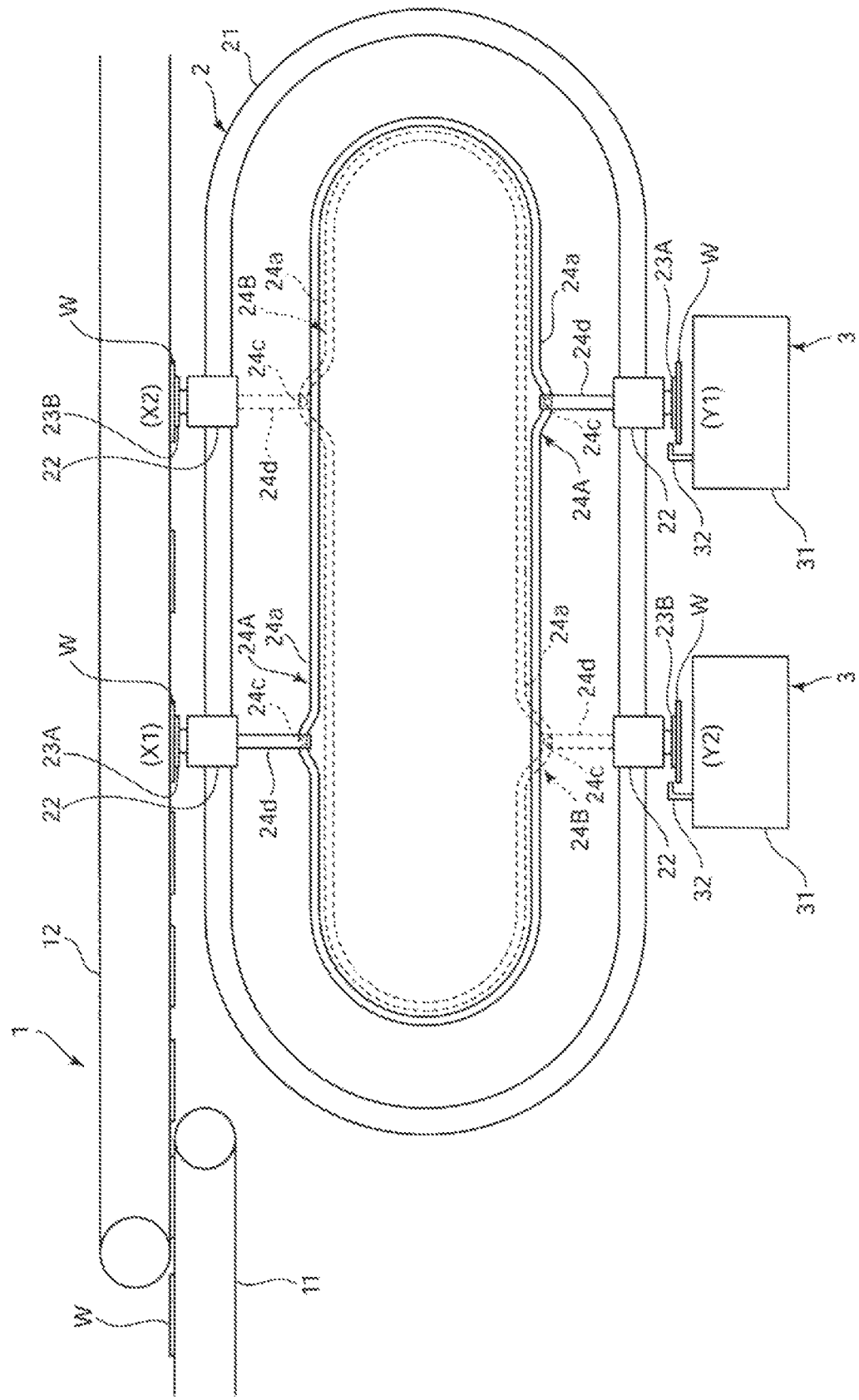
FIG. 8 is a front view showing a placement mechanism of a battery material stacking system according to a third embodiment of the present invention.

Next, a third embodiment of the present system according to the present invention will be explained while referring to FIG. 8 and FIG. 9.

In the present system, workpieces W conveyed from the conveyance mechanism 1 are picked up at two different places on the conveyance mechanism 1 and the rotationally conveyed workpieces W are stacked at two different places on the stacking mechanism 3.

Specifically, the present system is provided with a stator 21 of a linear motor having an oval shaped running rail, a plurality of movers 22 provided at the stator 21, and pickup members 23 provided at the movers 22 and picking up the workpieces W.

The pickup members 23 include first pickup members 23A and second pickup members 23B. The first pickup members 23A and the second pickup members 23B are alternately arranged along a circumferential direction of the stator 21. Note that, for convenience of illustration, in the figures, only the first pickup member 23A and the second pickup member 23B at the conveyance mechanism 1 side and the first pickup member 23A and the second pickup member 23B at the stacking mechanism 3 side are illustrated, but in actuality, greater numbers of first pickup members 23A and second pickup members 23B are alternately arranged.

Each first pickup member 23A picks up a workpiece W conveyed by the conveyance mechanism 1 at a first location X1 of the conveyance mechanism 1, rotationally conveys it exactly a half circumference to the right, then stacks the workpiece W at a first location Y1 of the stacking mechanism 3. Further, each second pickup member 23B picks up a workpiece W conveyed by the conveyance mechanism 1 at a second location X2 of the conveyance mechanism 1, rotationally conveys it to the right, then stacks the workpiece W at a second location Y2 of the stacking mechanism 3.

Further, in the present embodiment, the first pickup member 23A uses a first guide mechanism 24A of the same mechanism as the second embodiment to approach the conveyance mechanism 1 or the stacking mechanism 3. Further, the second pickup member 23B uses a second cam mechanism 24B of the same mechanism as the second embodiment to approach the conveyance mechanism 1 or the stacking mechanism 3.

Figure 9:
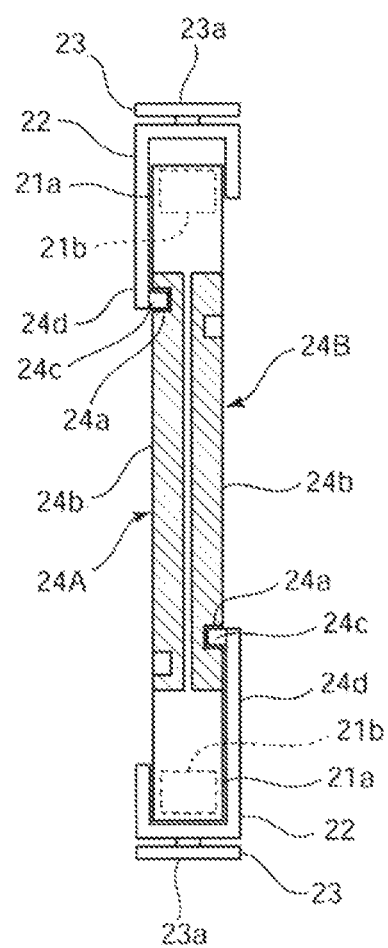
FIG. 9 is a cross-sectional view showing a placement mechanism of the system of FIG. 8.

Further, in the first guide mechanism 24A, as shown in FIG. 9, the cam follower 24c of a pickup member 23 engages with the cam groove 24a formed at the front side of the stator 21, while in the second guide mechanism 24B, the cam follower 24c of a pickup member 23 engages with the cam groove 24a formed at the back side of the stator 21. For this reason, the first pickup member 23A and the second pickup member 23B can pick up and stack workpieces W at mutually different locations without interfering with each other.

Note that, in the present embodiment, the two pickup members 23 of the first pickup member 23A and the second pickup member 23B are used to place the workpieces W, but three or more pickup members 23 may also be used to place the workpieces W.

Fourth Embodiment

Figure 10A:
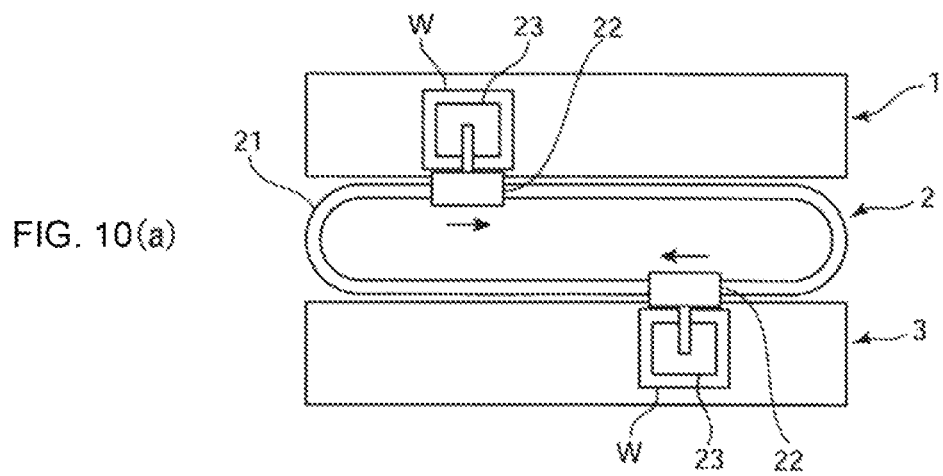
FIG. 10 (a) is a plan view showing a battery material stacking system according to a fourth embodiment of the present invention and FIG. 10 (b) is a side view showing a battery material stacking system according to a fourth embodiment of the present invention.
Figure 10B:
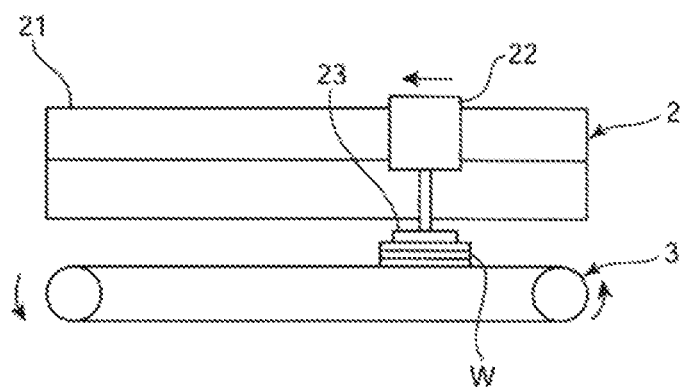

Next, a fourth embodiment of the present system according to the present invention will be explained while referring to FIGS. 10 (a) and 10 (b).

In the present system, a conveyance mechanism 1, placement mechanism 2, and stacking mechanism 3 are arranged aligned in the horizontal direction and are designed to place a workpiece W in a state while maintaining a horizontal state.

Specifically, the conveyance mechanism 1 is comprised of a belt conveyor rotating in an endless state and conveys workpieces W while carried in a horizontal state.

Further, the placement mechanism 2 is made one where a stator 21 is arranged in a horizontally prone state in a horizontal direction of the workpieces and the movers 22 run in the horizontal direction of the workpieces along a running rail of the stator 21. Further, the pickup members 23 are formed in shapes extending in an axial direction of rotation of the movers 22. The workpieces W are rotationally conveyed in the horizontal direction along with rotational running of the movers 22. Note that for convenience of explanation, in the drawings, single sets of movers 22 and pickup members 23 are illustrated at the conveyance mechanism 1 side and the stacking mechanism 3 side, but in actuality, pluralities of sets of movers 22 and pickup members 23 are provided at the stator 21.

Further, the stacking mechanism 3 is comprised of a belt conveyor rotating in an endless state. It conveys the workpieces W in a predetermined direction after stacking them in a horizontal state.

Further, in the process of being conveyed by the conveyance mechanism 1 while carried in a horizontal state, the workpieces W are picked up by the pickup members 23 of the placement mechanism 2 at a predetermined location in the horizontal state, rotationally conveyed in the horizontal state along with rotational running of the movers 22, then are stacked in the horizontal state at a predetermined location of the stacking mechanism 3. After that, the stack of the predetermined number of stacked workpieces W is conveyed by the belt conveyor of the stacking mechanism 3 in a predetermined direction.

Note that, in the present system as well, by providing the guide mechanism, when a pickup member 23 picks up or stacks a workpiece W, it may be made to approach the conveyance mechanism 1 or the stacking mechanism 3.

Further, the workpieces are made to move along the horizontal direction, but may also be placed along another direction so long as a direction is parallel to the planar direction of the workpieces.

Fifth Embodiment

Next, a fifth embodiment of the present system according to the present invention will be explained while referring to FIG. 11.

In the present system, the stacking mechanism 3 is comprised of a linear motor.

Figure 11:
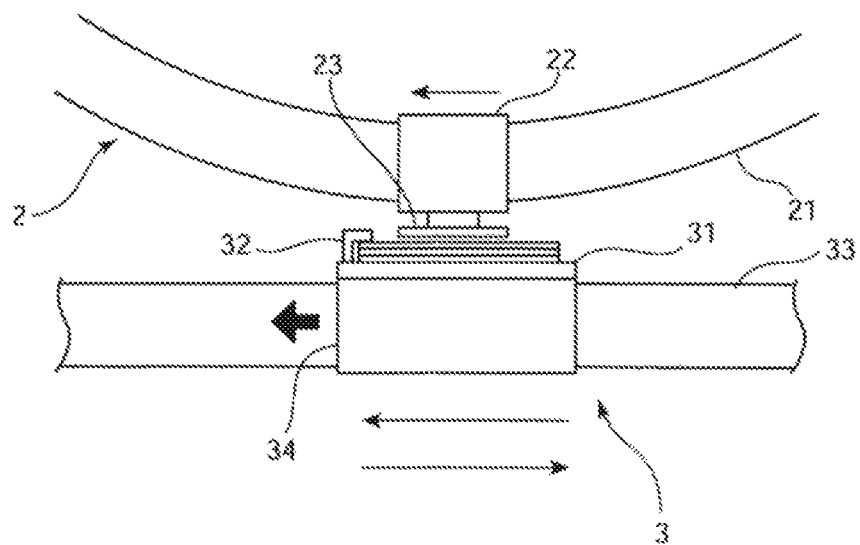
FIG. 11 is a front view showing a stacking mechanism of a battery material stacking system according to a fifth embodiment of the present invention.

Specifically, as shown in FIG. 11, the stacking mechanism 3 is provided with a stacking use stator 33 of a linear motor having a predetermined running rail, stacking use movers 34 of the linear motor provided at the stacking use stator 33, and stacking tables 31 provided at the stacking use movers 34 and upon which the workpieces W are stacked, and the running of the movers 22 at the stator 21 is controlled by the control part 100.

According to this stacking mechanism 3, at the time of start of stacking of the workpieces W, it is possible to quickly arrange a stacking table 31 at a predetermined stacking location and possible to quickly transport the stacking table 31 to a separate location for each workpiece W after stacking the workpieces W, so it becomes possible to efficiently produce a plurality of stacks of workpieces W.

Further, in this stacking mechanism 3, when a workpiece W is stacked by the pickup member 23, each stacking table 31 of the stacking mechanism 3 may be made to move exactly a predetermined distance forward in the rotational conveyance direction while synchronized with rotational conveyance of the workpiece W and move exactly a predetermined distance in the rotational conveyance direction to return to its original position after the workpiece W has been stacked. According to this, by making the stacking table 31 move by exactly a predetermined distance forward in the rotational conveyance direction while synchronized with the rotational conveyance of the workpiece W, the speed difference between the workpiece W and the stacking table 31 at the time of stacking is absorbed, so it is possible to prevent the workpiece W and the latch members 32 on the stacking table 31 etc. from striking each other or lessen the impact, further, it is possible to prevent rubbing at the stacking surface of the workpiece W, and becomes possible to obtain a better stack of workpieces.

Note that, in the present embodiment, the stacking mechanism 3 is made one configured by a linear motor, but it may also be configured by a ball screw or other mechanism.

Figure 12:
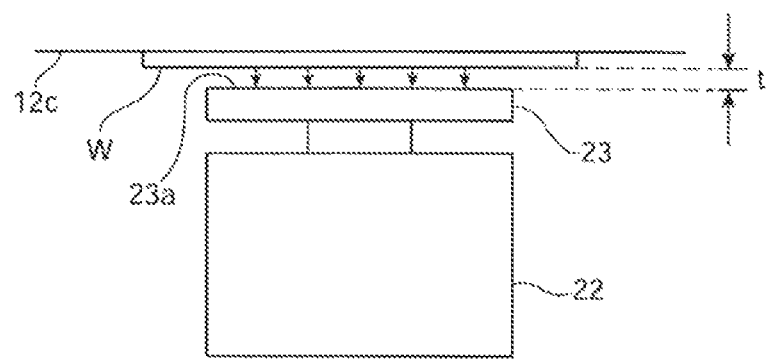
FIG. 12 is a front view showing a pickup member according to another embodiment of the present invention.

Note that, each pickup member 23, as shown in FIG. 12, may hold a workpiece W by suction in a state spaced apart from the workpiece W by a predetermined gap "t". According to this, when the pickup member 23 picks up the workpiece W, it is possible to prevent the pickup surface 23a of the pickup member 23 from ending up rubbing against the surface of the workpiece W. Further, in case where a plurality of placement mechanisms 2 are provided, when making a workpiece W pass through a predetermined placement mechanism 2 to pick it up by the pickup member 23 of the predetermined placement mechanism 2, it is possible to prevent the workpiece W from ending up unintentionally being picked up by the pickup member 23 of that predetermined placement mechanism 2.

Figure 13:
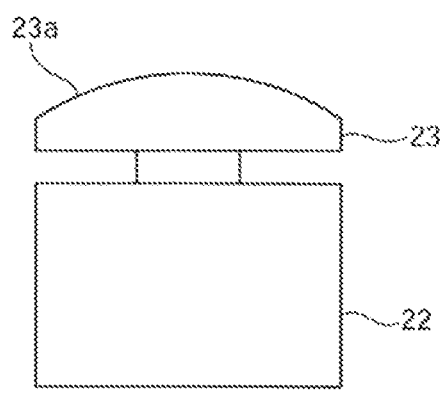
FIG. 13 is a front view showing a pickup member and arc pickup operation according to another embodiment of the present invention.

Further, the pickup member 23 with a pickup surface 23a picking up the workpiece W formed into a flat surface is used, but as shown in FIG. 13, the pickup member 23 with a pickup surface 23a picking up the workpiece W formed into a curved surface gently curved outward may also be used. According to this, tension occurs at the workpiece W held at the pickup member 23, so it is possible to prevent the workpiece W from rattling or curling up while the workpiece W is being rotated and conveyed by the pickup member 23.

Further, the shape and size of the pickup member 23 are not particularly limited, but the pickup member 23 is preferably formed to a shape and size not interfering with the latch members 32 and other members when stacking the workpieces W on the stacking table 31.

Further, the case of application of the present invention to a battery material stacking system is explained, but the present invention is not necessarily applied to a battery material stacking system. That is, the pickup member 23 may also be applied to another system relating to battery manufacture so long as having a placement mechanism 2 (battery material placement system) holding a workpiece W at a predetermined location, rotationally conveying that workpiece W along with a mover 22 running along a running rail of the mover 21, then placing that workpiece W at a separate location.

Above, referring to the drawings, embodiments of the present invention were explained, but the present invention is not limited to the illustrated embodiments. The illustrated embodiments can be corrected or modified in various ways within a scope the same as the present invention or within a scope of equivalency.

REFERENCE SIGNS LIST

1 . . . conveyance mechanism, 11 . . . first conveyance mechanism, 12 . . . second conveyance mechanism, 2 . . . placement mechanism, 21 . . . stator, 21*a* . . . guide rail, 21*b* . . . electromagnet, 22 . . . mover, 23 . . . pickup member, 23*a* . . . pickup surface, 24 . . . guide mechanism 24*a* . . . cam grooves, 24*b* . . . cam member, 24*c* . . . can follower, 24*d* . . . support member, 3 . . . stacking mechanism, 31 . . . stacking table, 32 . . . latch member, 33 . . . stacking use stator, 34 . . . stacking use mover, 100 . . . control part

The invention claimed is:

1. A battery material stacking system for stacking sheet-shaped workpieces relating to battery materials, comprising:
   a conveyance mechanism for conveying workpieces,
   a stacking mechanism for stacking the workpieces, and
   a placement mechanism for placing the workpieces conveyed by the conveyance mechanism at the stacking mechanism,
   wherein said placement mechanism includes:
      a linear motor, wherein the linear motor includes a stator having a predetermined running rail, a plurality of movers provided at the stator, and pickup members provided at the movers and configured to pick up the workpieces, and
      a control part controlling the movement of the movers on the stator, and
   wherein said pickup members pick up the workpieces conveyed from the conveyance mechanism, rotationally convey the workpieces as the movers run along the running rail of the stator, and then stack the workpieces at the stacking mechanism.

2. The battery material stacking system according to claim 1, wherein each of the pickup members rotationally conveys a workpiece then stacks the workpiece at the stacking mechanism while depositing a surface of the workpiece, which is located at the opposite side from an other surface of the workpiece at the pickup member side, facing towards the stacking mechanism.

3. The battery material stacking system according to claim 1, wherein the stacking mechanism is provided with the stator of a linear motor having a predetermined running rail, stacking use movers of a linear motor provided at the stator, stacking tables provided at the stacking use movers and on which the workpieces are stacked, and a control part controlling running of the stacking use movers on the stator.

4. The battery material stacking system according to claim 3, wherein each of the stacking tables moves in the conveyance direction of the workpiece while synchronized with the conveyance action of the workpieces when the workpieces are stacked by the pickup members.

* * * * *